US012630448B2

(12) United States Patent
Lu

(10) Patent No.: US 12,630,448 B2
(45) Date of Patent: May 19, 2026

(54) SEWAGE FILTERING AND PURIFYING DEVICE

(71) Applicants: Shun-Tsung Lu, Taichung City (TW);
Ta-Wei Lu, Taichung City (TW)

(72) Inventor: Shun-Tsung Lu, Taichung City (TW)

(73) Assignees: Shun-Tsung Lu, Taichung City (TW);
Ta-Wei Lu, Taichung City (TW)

( * ) Notice: Subject to any disclaimer, the term of this patent is extended or adjusted under 35 U.S.C. 154(b) by 529 days.

(21) Appl. No.: 18/305,129

(22) Filed: Apr. 21, 2023

(65) Prior Publication Data

US 2024/0351918 A1 Oct. 24, 2024

(51) Int. Cl.
| | |
|---|---|
| *C02F 1/461* | (2023.01) |
| *C02F 1/00* | (2023.01) |
| *C02F 1/02* | (2023.01) |
| *C02F 1/74* | (2023.01) |
| *C02F 9/20* | (2023.01) |

(52) U.S. Cl.
CPC .......... *C02F 1/46104* (2013.01); *C02F 1/001* (2013.01); *C02F 1/004* (2013.01); *C02F 1/02* (2013.01); *C02F 1/74* (2013.01); *C02F 9/20* (2023.01); *C02F 2201/008* (2013.01); *C02F 2201/009* (2013.01); *C02F 2201/4611* (2013.01)

(58) Field of Classification Search
CPC ...... C02F 1/46104; C02F 1/001; C02F 1/004; C02F 1/74; C02F 9/20; C02F 2201/008; C02F 2201/009; C02F 2201/4611; C02F 2201/007
See application file for complete search history.

(56) References Cited

U.S. PATENT DOCUMENTS

| | | | | |
|---|---|---|---|---|
| 5,728,287 | A | * 3/1998 | Hough | ................. C02F 1/4672 |
| | | | | 205/742 |
| 6,436,283 | B1 | * 8/2002 | Duke | ........................ E03B 3/02 |
| | | | | 210/748.11 |
| 2019/0039031 | A1 | * 2/2019 | Li | ........................... B01F 23/29 |
| 2019/0047875 | A1 | * 2/2019 | Lu | ........................... C02F 1/004 |

FOREIGN PATENT DOCUMENTS

| | | | | |
|---|---|---|---|---|
| CN | 111875127 | A | * 11/2020 | ................ C02F 9/00 |

* cited by examiner

*Primary Examiner* — Liam Royce
(74) *Attorney, Agent, or Firm* — RABIN & BERDO, P.C.

(57) ABSTRACT

A sewage filtering and purifying device has at least one purifying module having multiple filters and multiple electrolyzing assemblies connected in series. Each electrolyzing assembly has a flow pipe and two electrodes disposed inside the flow pipe. The two electrodes are configured to be polarized for respectively being a cathode and an anode. When treated by the sewage filtering and purifying device, sewage first flows through and is filtered by the multiple filters; then the sewage flows through and is electrolyzed by the multiple electrolyzing assemblies. Since the sewage is filtered by the multiple filters first, the sewage can be electrolyzed better in the multiple electrolyzing assemblies, and harmful substances in the sewage can be oxidized or reduced and transformed to harmless substances. Thereby, the sewage is purified better.

9 Claims, 11 Drawing Sheets

SEWAGE FILTERING AND PURIFYING DEVICE

BACKGROUND OF THE INVENTION

1. Field of the Invention

The present invention relates to sewage treatment, and particularly to a sewage filtering and purifying device.

2. Description of Related Art

Electrolysis is a technique to electrify two electrodes in liquid to respectively be a cathode and an anode and allow electrolyte in the liquid to be reduced on the cathode or to be oxidized on the anode. Nowadays, electrolysis is applied in sewage treatment, and substances such as some heavy metal ions (e.g. cadmium), sulfur, or organophosphate can be oxidized or reduced on said electrodes to be transformed to harmless substances.

However, purifying sewage simply by electrolysis cannot remove impurities that are not oxidizable or reducible from the sewage, and those impurities may further be attached onto the electrodes, interfere with the oxidization and reduction on said electrodes, and cause wastes of electricity during the process of electrolysis.

To overcome the shortcomings, the present invention tends to provide a sewage filtering and purifying device to mitigate or obviate the aforementioned problems.

SUMMARY OF THE INVENTION

The main objective of the present invention is to provide users with a sewage filtering and purifying device that may filter other impurities first and then treat harmful substances by electrolysis.

The sewage filtering and purifying device has at least one purifying module having multiple filters and multiple electrolyzing assemblies. The multiple filters are connected in series, and the multiple electrolyzing assemblies are connected to the multiple filters to allow sewage to flow through and be filtered by the multiple filters and then sequentially flow through the multiple electrolyzing assemblies. Each one of the multiple electrolyzing assemblies has a flow pipe, two electrodes, and an outlet pipe. The two electrodes are disposed inside the flow pipe and are configured to be polarized for respectively being a cathode and an anode. The outlet pipe is connected to the flow pipe and is configured to make the sewage flow from the flow pipe to said flow pipe of an adjacent one of the multiple electrolyzing assemblies or an exterior of the flow pipe. The at least one purifying module has multiple heating assemblies. Each one of the multiple heating assemblies is disposed between adjacent two of the multiple electrolyzing assemblies and has a flow tube, at least one heating component, and an outlet tube. The flow tube is connected to the outlet pipe of one of the adjacent two of the multiple electrolyzing assemblies. The at least one heating component is inserted into the flow tube. The outlet tube is connected to the flow tube and the flow pipe of the other one of adjacent two of the multiple electrolyzing assemblies.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
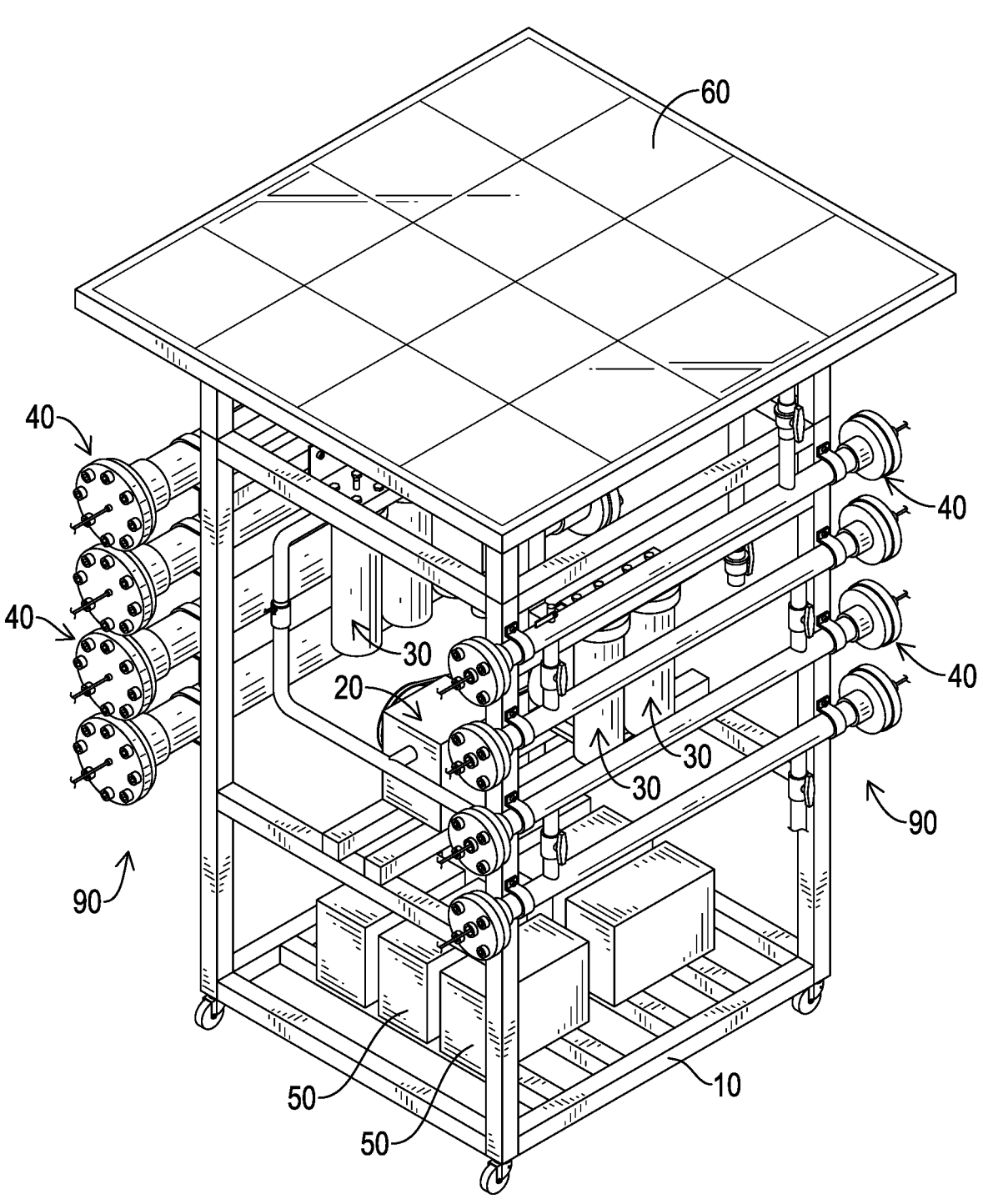
FIG. 1 is a perspective view of a sewage filtering and purifying device of a first preferred embodiment in accordance with the present invention.
Figure 2:
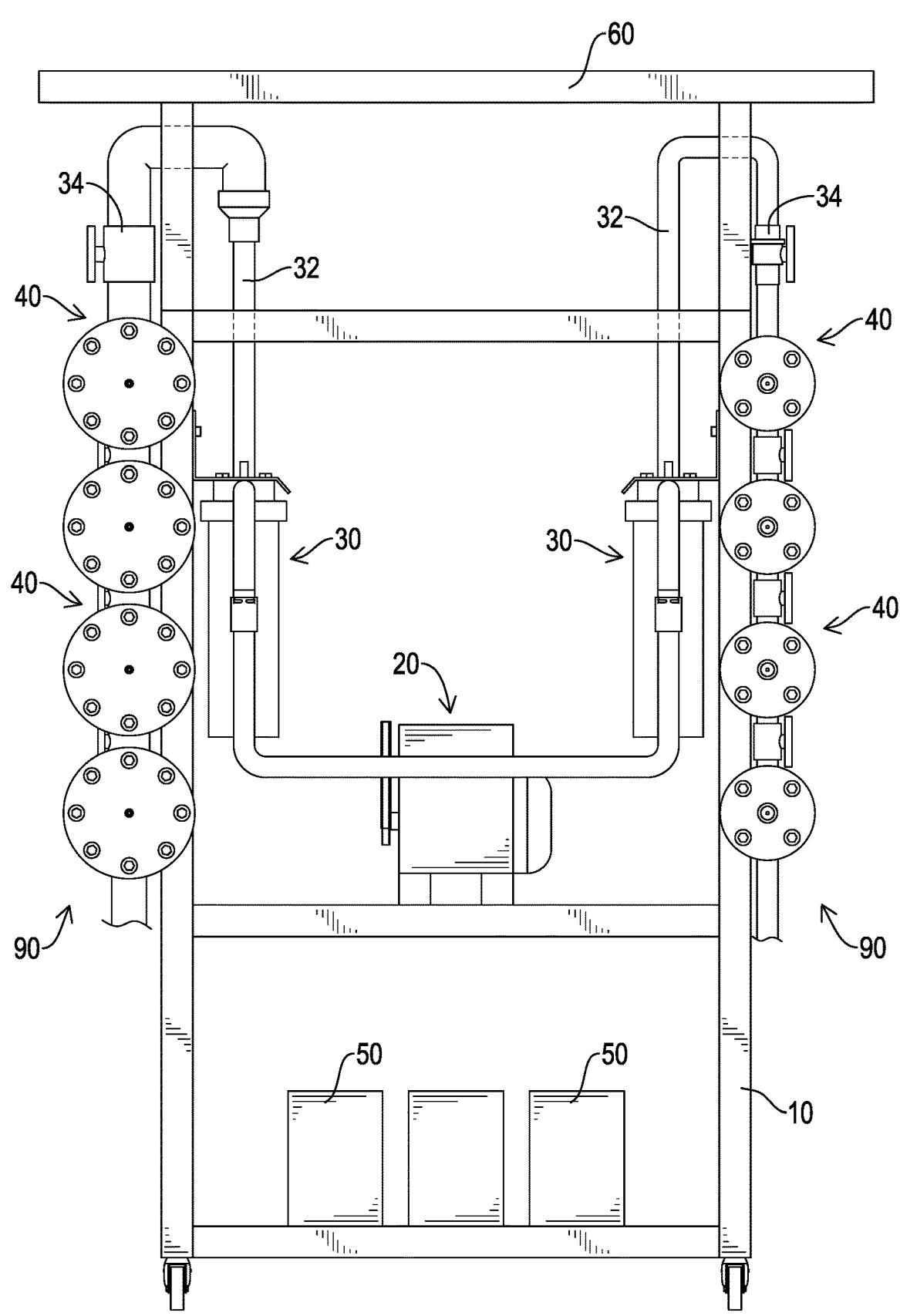
FIG. 2 is a side view of the sewage filtering and purifying device in FIG. 1.
Figure 3:
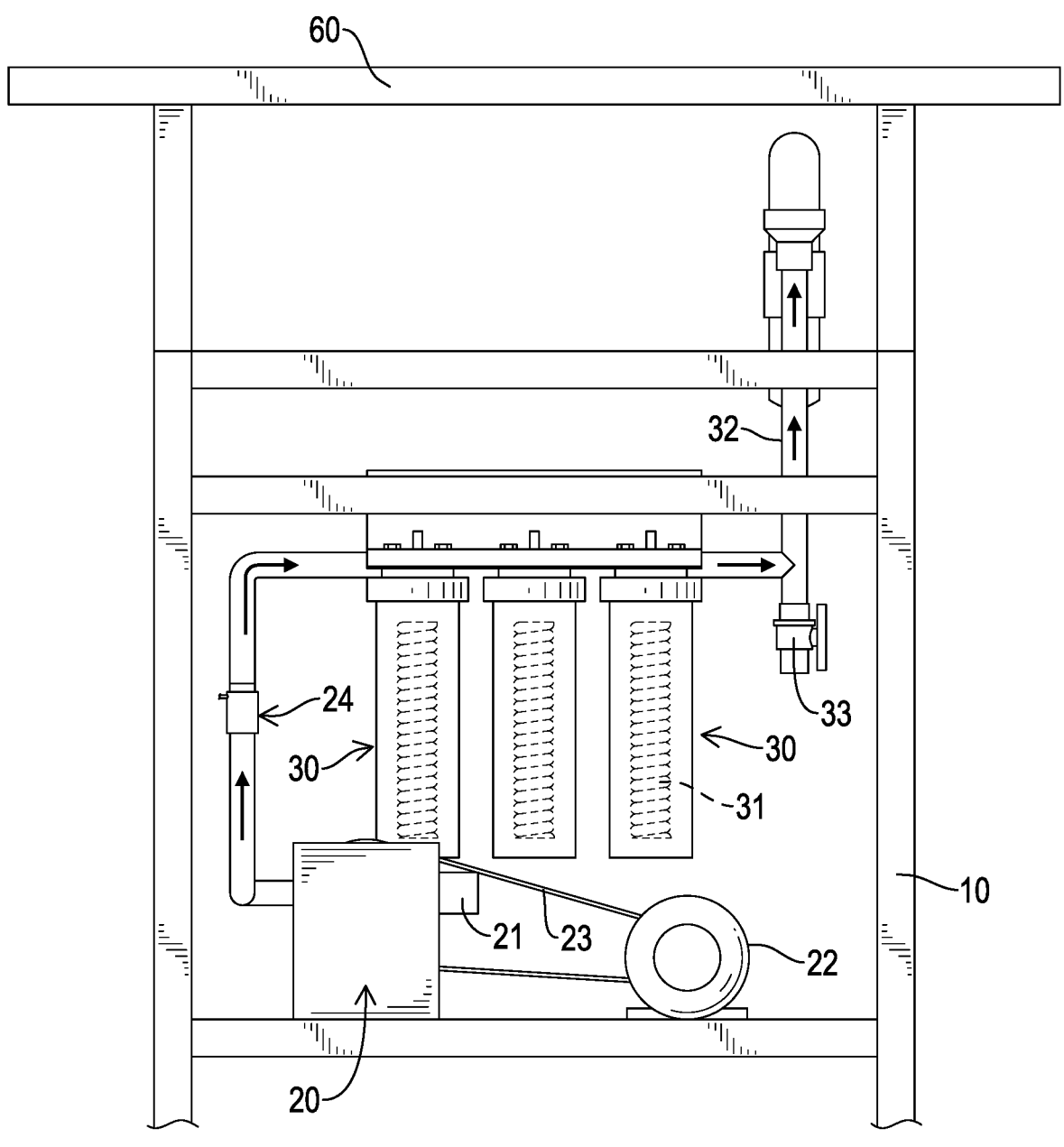
FIG. 3 is a side view of a pump and multiple filters of the sewage filtering and purifying device in FIG. 1.

With reference to FIGS. 1 and 2, a sewage filtering and purifying device of a first preferred embodiment in accordance with the present invention has a frame 10, a pump 20, and two purifying modules 90. Each one of the two purifying modules 90 has multiple filters 30 and multiple electrolyzing assemblies 40. The pump 20 and the two purifying modules 90 are disposed on the frame 10. With reference to FIG. 3, the multiple filters 30 are connected in series, and the pump 20 is connected to a respective one of the multiple filters 30; with reference to FIGS. 5 and 6, the multiple electrolyzing assemblies 40 are connected to the multiple filters 30 to allow sewage to flow through and be filtered by the multiple filters 30 and then sequentially flow through the multiple electrolyzing assemblies 40.

With reference to FIG. 3, the pump 20 is drivable to pump the sewage to sequentially flow through the multiple filters 30. Specifically, the pump 20 has an inlet 21 configured to be connected to a pipe for the sewage to be pumped, and the pump 20 is connected to a motor 22 via a belt 23. The motor 22 drives the pump 20 by the transmission of the belt 23 to pump the sewage to the multiple filters 30. In other embodiments, the sewage may flow to the multiple filters 30 by the potential energy of the sewage, which means an absolute altitude of the sewage is higher than an absolute altitude of the sewage filtering and purifying device to allow the sewage to automatically flow to the corresponding filter 30. In the first preferred embodiment, the pump 20 enables the sewage filtering and purifying device to pump the sewage to the corresponding filter 30 initiatively.

Figure 4:
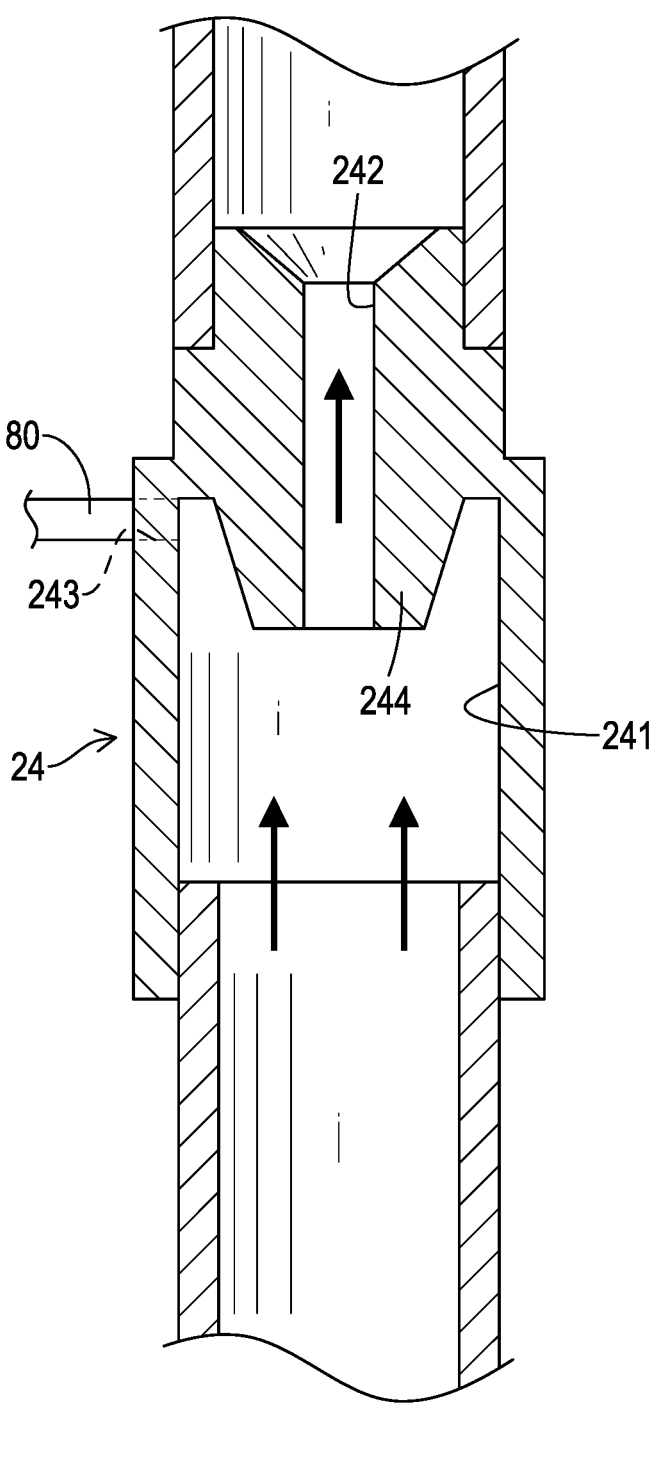
FIG. 4 is a sectional side view of a jet aerator of the sewage filtering and purifying device in FIG. 1.

With reference to FIGS. 2 and 3, in the first preferred embodiment, each one of the two purifying modules 90 has a jet aerator 24 disposed to a pipeline between the pump 20 and the corresponding filter 30. With reference to FIG. 4, the jet aerator 24 has a first flow passage 241, a second flow passage 242, and at least one aeration hole 243. The first flow passage 241 and the second flow passage 242 are defined inside the jet aerator 24, and the second flow passage 242 communicates with the first flow passage 241 and the corresponding filter 30 to allow the sewage to sequentially flow through the first flow passage 241, the second flow passage 242, and the multiple filters 30. The second flow passage 242 has a cross-sectional area smaller than a cross-sectional area of the first flow passage 241; specifically, the jet aerator 24 has a protrusion 244 extending into the first flow passage 241, and the second flow passage 242 is defined through the protrusion 244.

With reference to FIG. 4, the at least one aeration hole 243 is defined through a surrounding wall of the jet aerator 24 and communicates with the first flow passage 241 and the exterior of the jet aerator 24 by connecting to an air intake pipe 80. When the sewage flows from the first flow passage 241 having a larger cross-sectional area to the second flow passage 242 having a smaller cross-sectional area, air outside flows through the air intake pipe 80 and the at least one aeration hole 243, enters the first flow passage 241, and flows to the second flow passage 242 along with the sewage flowing through the first flow passage 241 to disturb the sewage. The operating principle of the jet aerator 24 is similar with conventional jet aerators. By disturbing the sewage with the air, the jet aerator 24 prevents impurities in the sewage from accumulating in the pipeline and enables the sewage to fluently flow to the corresponding filter 30 for filtering.

With reference to FIG. 3, the multiple filters 30 connected in series allow the sewage to be filtered by the multiple filters 30 sequentially. In the first preferred embodiment, each one of the multiple filters 30 has at least one filtering unit 31 being a spring, which means that each one of the multiple filters 30 is a spring filter. A size of each one of multiple gaps in the spring is adjustable by elastic deformation of the spring, and impurities of different sizes may be respectively filtered by said gaps of different sizes. The spring filter is conventional, and thus other details of the spring filter are not described.

Furthermore, the at least one filtering unit 31 of each one of the multiple filters 30 is configured to be electrified to electrocute microbes in the sewage such that microbes having smaller volume will not be left unfiltered. In other embodiments, each one of the multiple filters 30 may be a general filter applying a filter screen or a filter element, or the multiple filters 30 may respectively be different types of filters. Configurations of the multiple filters 30 are not limited to the first preferred embodiment.

Figure 5:
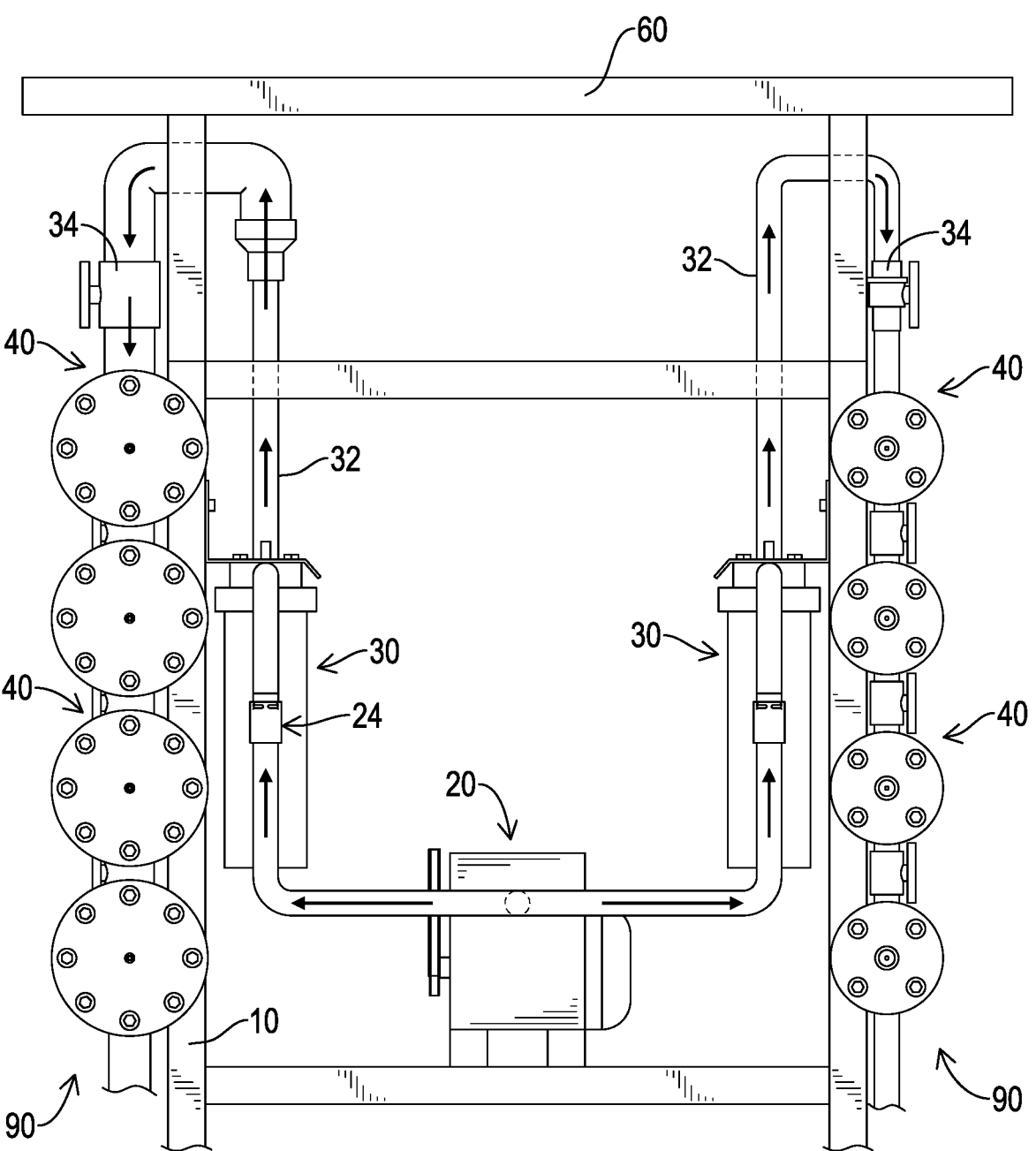
FIG. 5 is an enlarged operational side view of the sewage filtering and purifying device in FIG. 1.
Figure 6:
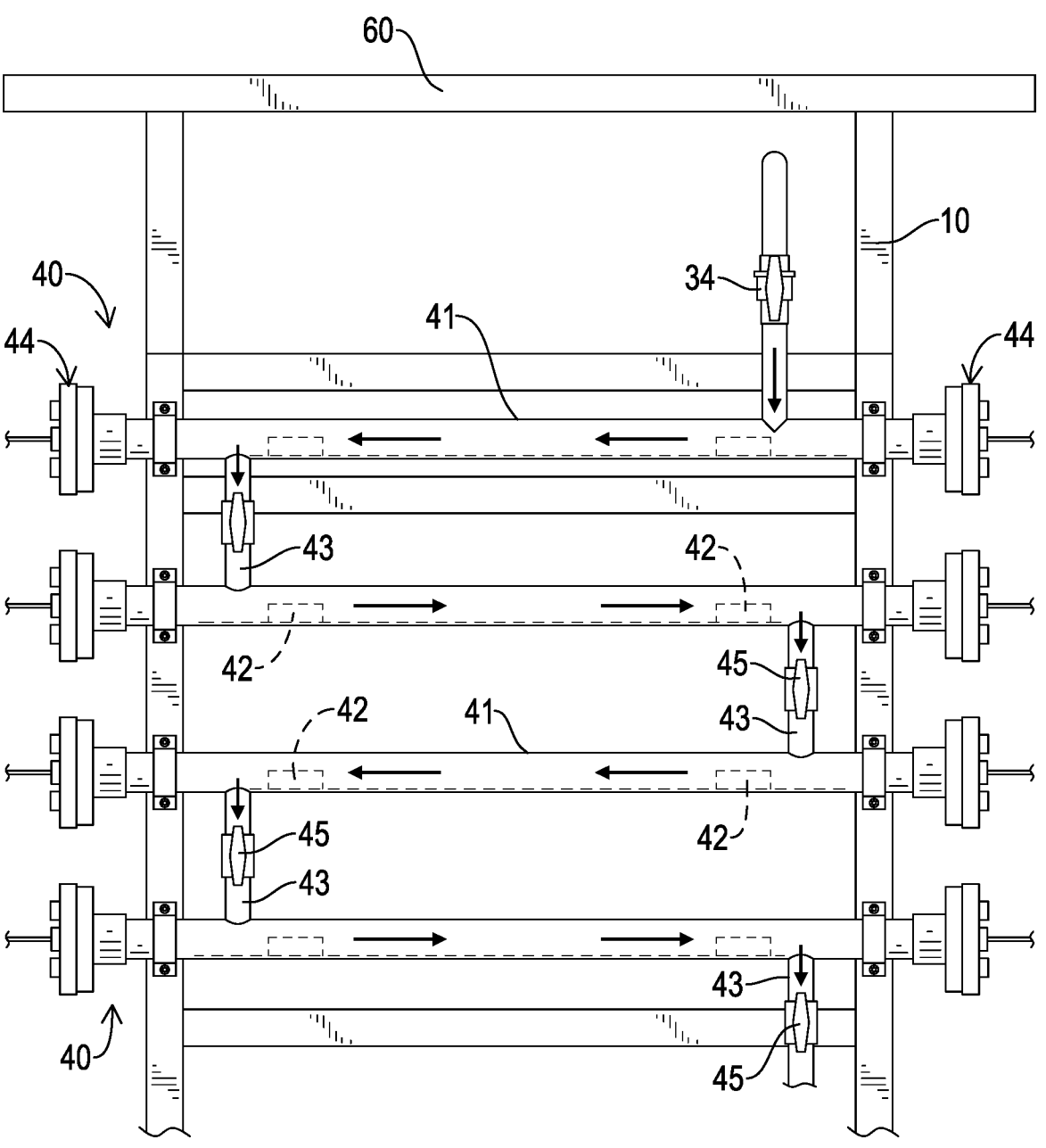
FIG. 6 is an operational side view of multiple electrolyzing assemblies of the sewage filtering and purifying device in FIG. 1.

With reference to FIGS. 3, 5, and 6, after sequentially flowing through and being filtered by the multiple filters 30, the sewage flows through a vertical connecting tube 32 to a first one of the multiple electrolyzing assemblies 40. With reference to FIG. 6, each one of the multiple electrolyzing assemblies 40 has a flow pipe 41, two electrodes 42, and an outlet pipe 43. The flow pipe 41 is elongated, is disposed horizontally, and is configured for the sewage from the multiple filters 30 to flow through. The two electrodes 42 are disposed inside the flow pipe 41. The outlet pipe 43 is connected to the flow pipe 41 and is connected to said flow pipe 41 of an adjacent one of the multiple electrolyzing assemblies 40, which allows the sewage to flow from the flow pipe 41, through the outlet pipe 43, and to said flow pipe 41 of the adjacent electrolyzing assembly 40. Otherwise, the sewage flowing through the outlet pipe 43 of a last one of the multiple electrolyzing assemblies 40 flows to an exterior of the last electrolyzing assembly 40, and specifically, the sewage is purified and is transformed to usable water for industries to be collected or be applied by piping.

The two electrodes 42 are configured to be polarized for respectively being a cathode and an anode. Specifically, each one of the two electrodes 42 may be made of graphene, titanium or other materials. As long as the two electrodes 42 can be respectively polarized as a cathode and an anode, the two electrodes 42 are not limited to any specific material. By the two electrodes 42 respectively being a cathode and an anode, the sewage can be electrolyzed while flowing through the flow pipe 41, and harmful substances such as heavy metal ions (e.g. cadmium), sulfur, or organophosphate are oxidized or reduced on said electrode 42 and are transformed to harmless substances. Thereby, after the sewage sequentially flows through said flow pipes 41 of the multiple electrolyzing assemblies 40, harmful substances in the sewage are gradually reduced, and the sewage is thus purified.

When the sewage filtering and purifying device is applied in sewage treatment, the sewage is first pumped to the multiple filters 30 and is sequentially filtered by the multiple filters 30 to remove impurities having larger volume from the sewage. After filtered by the multiple filters 30, the sewage sequentially flows through the multiple electrolyzing assemblies 40 and is electrolyzed in each one of the multiple electrolyzing assemblies 40. When the sewage flows through the flow tube 41, harmful substances in the sewage are oxidized or reduced on said electrode 42. By sequential electrolysis of the multiple electrolyzing assemblies 40, the sewage filtering and purifying device greatly reduces harmful substances in the sewage and effectively purifies the sewage.

In the sewage filtering and purifying device of the present invention, the sewage is sequentially filtered by the multiple filters 30 to remove other impurities from the sewage first and then is sequentially electrolyzed by the multiple electrolyzing assemblies 40 to reduce harmful substances in the sewage. During electrolysis in the multiple electrolyzing assemblies 40, since other impurities are removed from the sewage by the multiple filters 30 first, efficacy of electrolyzing and purifying in the multiple electrolyzing assemblies 40 can be stable and are not interfered by other impurities. Thereby, the sewage filtering and purifying device may effectively purify the sewage and turn the sewage to usable water for industries.

With reference to FIGS. 1 and 2, in the first preferred embodiment, the pump 20, the multiple filters 30 and the multiple electrolyzing assemblies 40 of said purifying module 90 are disposed on the frame 10, and the frame 10 has multiple caster wheels on its bottom. The sewage filtering and purifying device further has multiple power storage modules 50 disposed on the frame 10, and with reference to FIGS. 8A and 8B, each one of the multiple power storage modules 50 is electrically connected to the two electrodes 42 of each one of the multiple electrolyzing assemblies 40. With the frame 10 and said power storage module 50, the sewage filtering and purifying device is movable to a site without power supply for purifying water, which saves costs of transporting the sewage to a sewage treatment facility and transporting the sewage back to the original site for use.

Figure 8A:
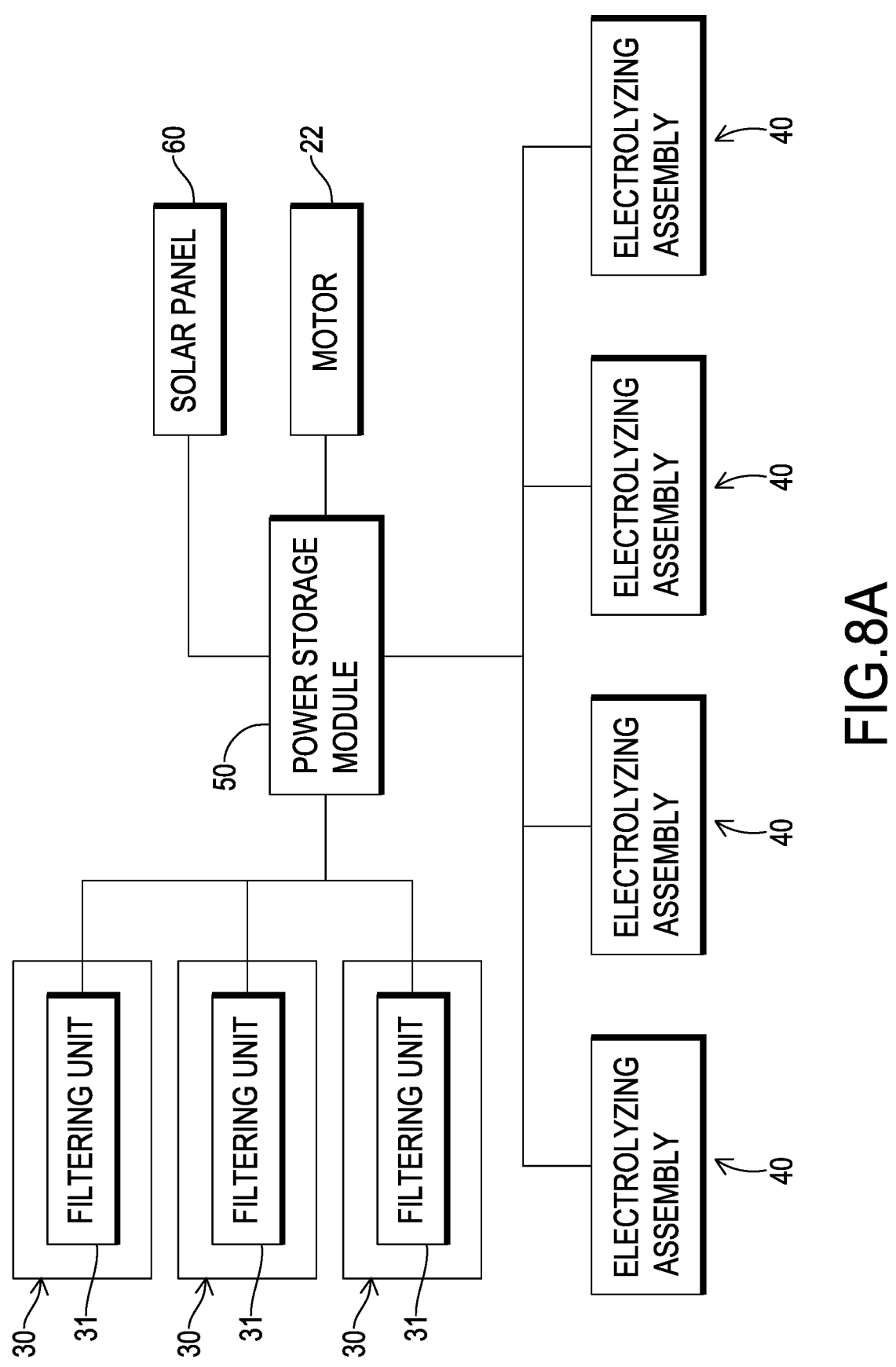
FIGS. 8A and 8B are system block diagrams of the sewage filtering and purifying device in FIG. 1.
Figure 8B:
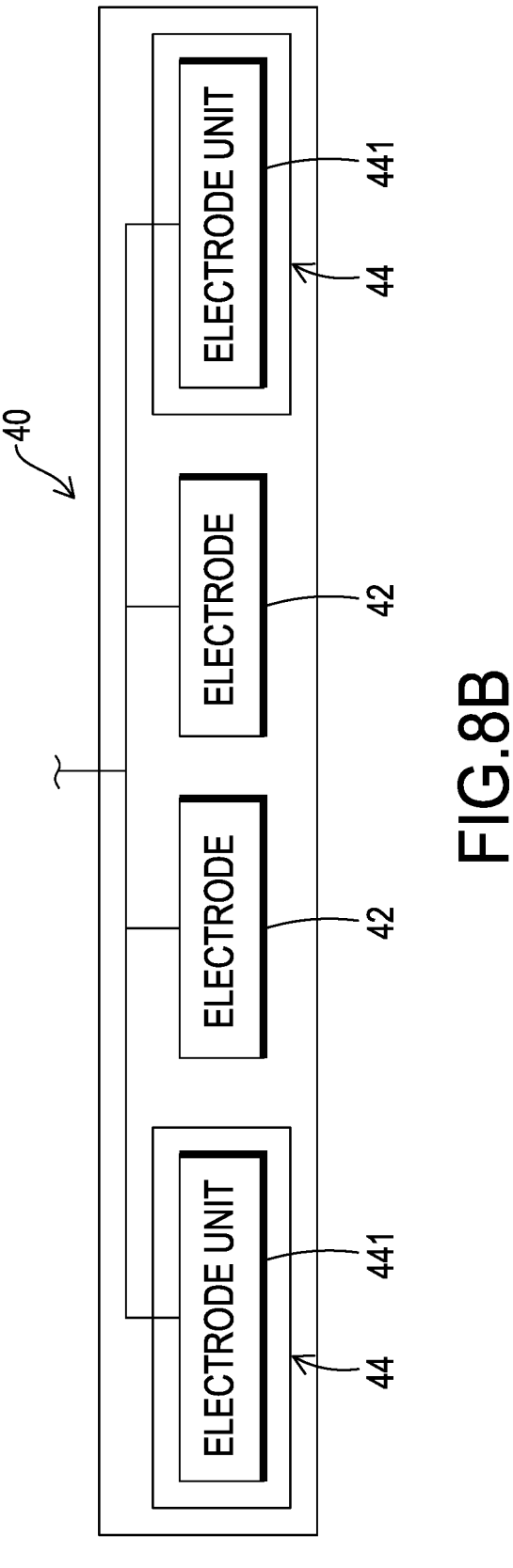

With reference to FIGS. 8A and 8B, in the first preferred embodiment, the motor 22 for driving the pump 20 and said filtering unit 31 of each one of the multiple filters 30 for electrocuting microbes are also electrically connected to said power storage module 50 and powered by said power storage module 50. Alternatively, with reference to FIG. 1, in the first preferred embodiment, the sewage filtering and purifying device has the multiple power storage modules 50; in other embodiments, quantity of said power storage module 50 can be decided according to required capacitance of the sewage filtering and purifying device. As long as the sewage filtering and purifying device has at least one power storage module 50, the sewage filtering and purifying device is movable to a site without power supply for purifying sewage.

With reference to FIGS. 1, 2, 8A, and 8B, in the first preferred embodiment, the sewage filtering and purifying device has a solar panel 60 disposed on a top of the frame 10 and electrically connected to each one of the multiple power storage modules 50. When the sewage filtering and purifying device purifies sewage outdoors, the solar panel 60 generates electricity in sunny days to recharge said power storage module 50. Thereby, operation time of the sewage filtering and purifying device purifying sewage at a site without power supply can be expanded.

With reference to FIGS. 3 and 5, in the first preferred embodiment, the vertical connecting tube 32 is disposed between the multiple filters 30 and the multiple electrolyzing assemblies 40. Specifically, with reference to FIG. 3, a last one of the multiple filters 30 is connected to a side of the vertical connecting tube 32 and communicates with the vertical connecting tube 32 via piping. With reference to FIGS. 3 and 5, the vertical connecting tube 32 extends upward and is connected to an inverted U-shaped tube, and the sewage filtering and purifying device has a valve 34 connected to the inverted U-shaped tube and the flow tube 41 of the first one of the multiple electrolyzing assemblies 40 near the top of the frame 10. The sewage filtering and purifying device further has an outlet valve 33 disposed to a bottom of the vertical connecting tube 32. The outlet valve 33 is drivable to allow the bottom of the vertical connecting tube 32 to communicate with an exterior of the vertical connecting tube 32. The valve 34 is drivable to allow the vertical connecting tube 32 and the first one of the multiple electrolyzing assemblies 40 to communicate with each other.

In the first preferred embodiment, with the vertical connecting tube 32, the outlet valve 33, and the valve 34, after the sewage is sequentially filtered by the multiple filters 30, a user may switch the valve 34 to a closed position, switch the outlet valve 33 to an open position, and obtain the sewage that has been filtered by the multiple filters 30 to detect filtering effect of the multiple filters 30. Moreover, after operating for a period of time, some impurities may accumulate at the bottom of the vertical connecting tube 32, and the user can remove those impurities by switching the outlet valve 33 to the open position.

Figure 7:
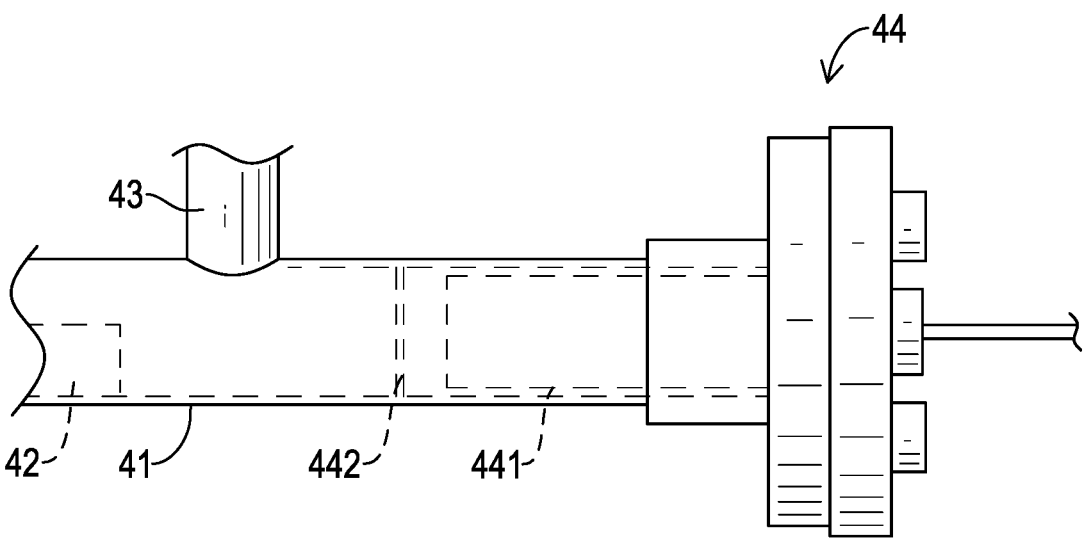
FIG. 7 depicts the construction of an electrode and an electro-dialysis component of the electrolyzing assemblies of the sewage filtering and purifying device in FIG. 1.

With reference to FIGS. 6 and 7, in the first preferred embodiment, each one of the multiple electrolyzing assemblies 40 has two electro-dialysis components 44 respectively disposed on two opposite ends of the flow pipe 41. With reference to FIG. 7, each one of the two electro-dialysis components 44 has an electrode unit 441 and an ion-exchange membrane 442. Said electrode units 441 of the two electro-dialysis components 44 are configured to be polarized for respectively being a cathode and an anode. With reference to FIG. 8, in the first embodiment, the electrode unit 441 is electrically connected to said power storage modules 50. Property of the ion-exchange membrane 442 depends on the electrode unit 441; if the electrode unit 441 is a cathode, the ion-exchange membrane 442 is an anion-exchange membrane; if the electrode unit 441 is an anode, the ion-exchange membrane 442 is a cation-exchange membrane. With reference to FIGS. 6 and 7, said ion-exchange membranes 442 of the two electro-dialysis components 44 are disposed between said electrode units 441 of the two electro-dialysis components 44.

The two electro-dialysis components 44 may operate before or after the electrolysis of said electrolyzing assembly 40. Polarizations of the two electrodes 42 are suspended first, and then the two electro-dialysis components 44 start to electrodialyze the sewage for separating unoxidizable or irreducible ions from the sewage after or before the electrolysis. By electrolysis and electro-dialysis in each one of the multiple electrolyzing assemblies 40, the sewage filtering and purifying device may purify the sewage better.

With reference to FIG. 6, the outlet pipe 43 of each one of the multiple electrolyzing assemblies 40 is disposed near one of two opposite ends of the flow pipe 41, and said outlet pipes 43 of the multiple electrolyzing assemblies 40 are in staggered arrangement; specifically, said flow pipes 41 of the multiple electrolyzing assemblies 40 are parallel, and the two opposite ends of the flow pipe 41 are respectively a first end and a second end. In adjacent two of the multiple electrolyzing assemblies 40, the outlet pipe 43 of one of the adjacent two electrolyzing assemblies 40 is disposed near the first end of the flow pipe 41, and the outlet pipe 43 of the other one of the adjacent two electrolyzing assemblies 40 is disposed near the second end of the flow pipe 41. With reference to FIG. 6, said outlet pipes 43 of adjacent two of the multiple electrolyzing assemblies 40 are respectively near the left side and the right side in FIG. 6. Thereby, when flowing through the flow pipe 41 of each one of the multiple electrolyzing assemblies 40, the sewage flows from one of the two opposite ends of the flow pipe 41 to the other one of the two opposite ends of the flow pipe 41 and is exactly electrolyzed by the two electrodes 42 inside the flow pipe 41.

With reference to FIG. 6, in the first preferred embodiment, each one of the multiple electrolyzing assemblies 40 further has a fluid valve 45 disposed to the outlet pipe 43. The fluid valve 45 is drivable to switch between an open position and a closed position and to allow the flow pipe 41 to communicate with said flow pipe 41 of adjacent one of the multiple electrolyzing assemblies 40. When the sewage flows into the flow pipe 41, the fluid valve 45 can switch to the closed position to keep the sewage staying in the flow pipe 41 for being continuously electrolyzed by the two electrodes 42, which extends the electrolyzing time in each one of the multiple electrolyzing assemblies 40. By extending of the electrolyzing time and sequential electrolysis of the multiple electrolyzing assemblies 40, effect of reducing harmful substances in the sewage is further improved.

In the above description of the first preferred embodiment, the sewage filtering and purifying device has said outlet pipes 43 of the multiple electrolyzing assemblies 40 in staggered arrangement and the fluid valve 45 of each electrolyzing assembly 40 disposed to the outlet pipe 43. In other embodiments, the sewage filtering and purifying device may have only one of the above two configurations, which still allows each electrolyzing assembly 40 to electrolyze the sewage. In the first preferred embodiment, the above two configurations allow the sewage to be exactly electrolyzed and extend the time of electrolysis in each electrolyzing assembly 40, which improves effect of reducing harmful substances in the sewage and purifies the sewage better.

Moreover, with reference to FIGS. 2 and 5, in the first preferred embodiment, the sewage filtering and purifying device has the two purifying modules 90 respectively disposed on two sides of the frame 10. In other embodiments, the sewage filtering and purifying device may have only one said purifying module 90. In the first preferred embodiment, the two purifying modules 90 may treat the sewage simultaneously to improve efficiency of sewage treatment. Additionally, said multiple electrolyzing assemblies 40 of the two purifying modules 90 may have different sizes, i.e., the user may adjust quantities of the multiple filters 30 and the multiple electrolyzing assemblies 40, types of the multiple filters 30, or the size of each one of the multiple electrolyzing assemblies 40 according to source or amount of the sewage.

Figure 9:
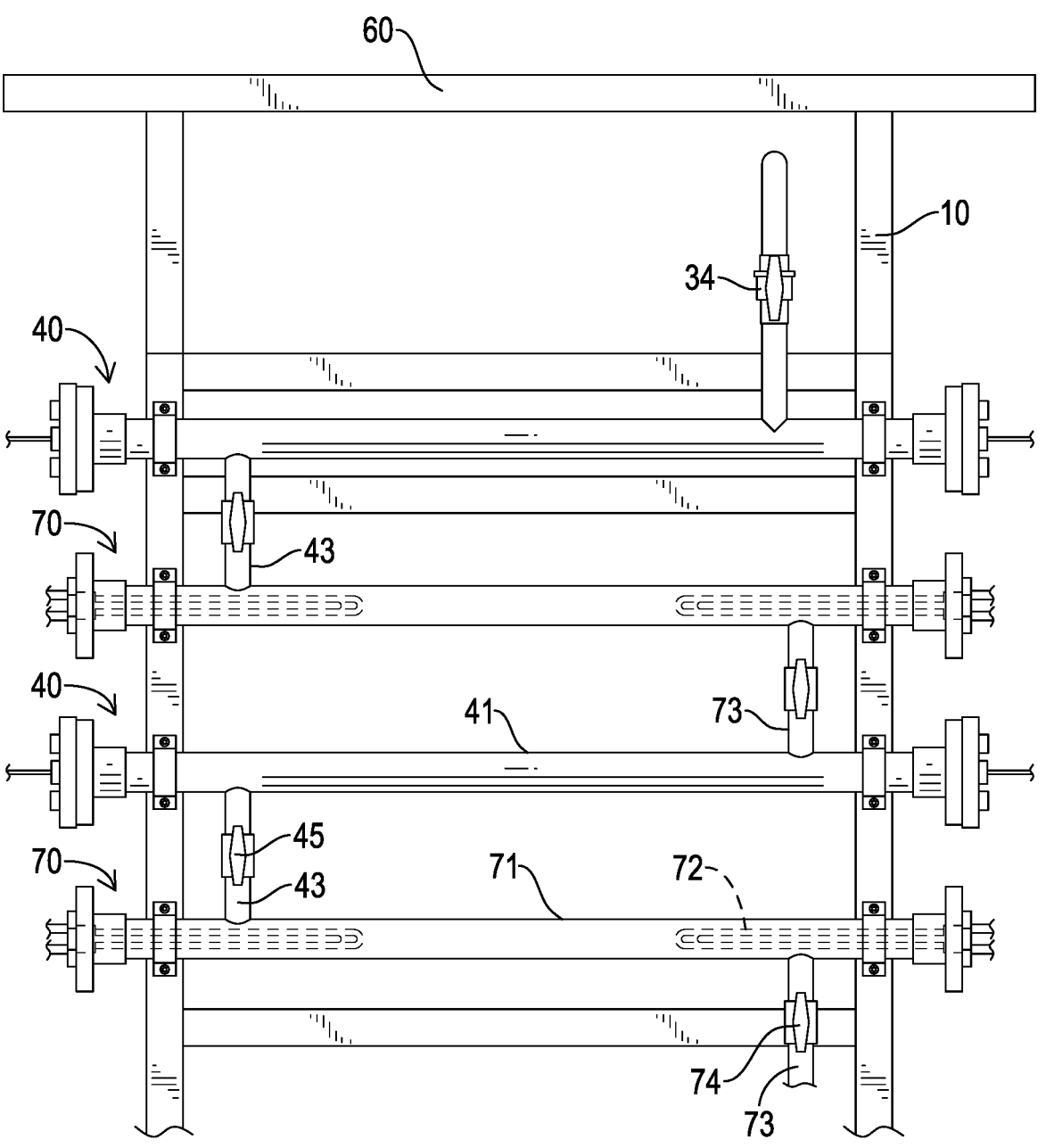
FIG. 9 is a side view of the electrolyzing assemblies and heating assemblies of the sewage filtering and purifying device of a second preferred embodiment in accordance with the present invention.
Figure 10:
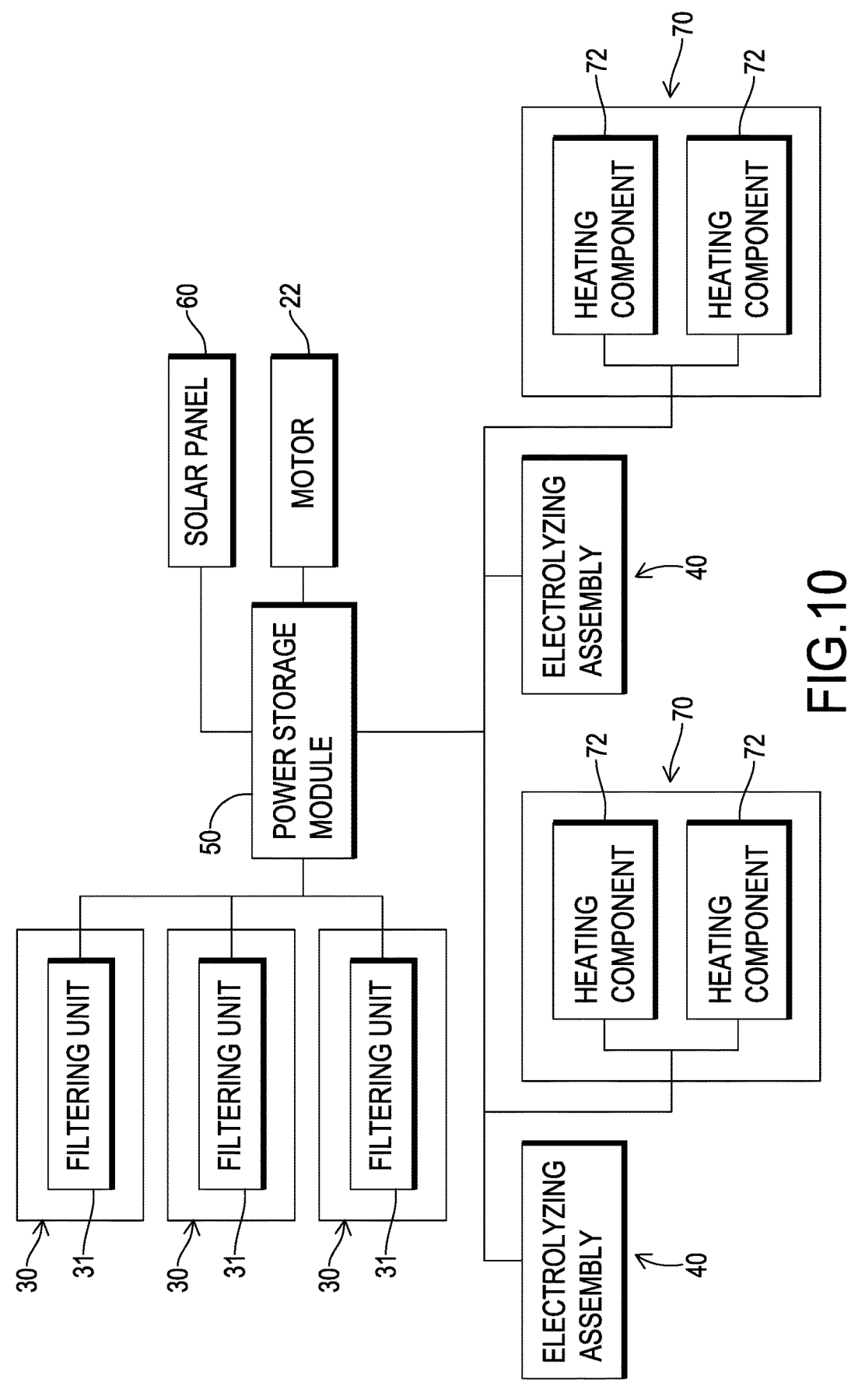
FIG. 10 is a system block diagram of the sewage filtering and purifying device in FIG. 9.

With reference to FIGS. 9 and 10, a sewage filtering and purifying device of a second preferred embodiment in accordance with the present invention is similar with the sewage filtering and purifying device in the first preferred embodiment. Differently, in the second embodiment, each one of the two purifying modules 90 has multiple heating assemblies 70, and the multiple heating assemblies 70 and the multiple electrolyzing assemblies 40 are in staggered arrangement; specifically, each one of the multiple heating assemblies 70 is disposed between adjacent two of the multiple electrolyzing assemblies 40; after flowing through one of the adjacent two of the multiple electrolyzing assemblies 40, the sewage flows through said heating assembly 70 and then enters the other one of the adjacent two of the multiple electrolyzing assemblies 40.

With reference to FIG. 9, each one of the multiple heating assemblies 70 has a flow tube 71, two heating components 72, and an outlet tube 73. The flow tube 71 is connected to the outlet pipe 43 of one of the adjacent two of the multiple electrolyzing assemblies 40, and the outlet tube 73 is connected to the flow tube 71 and the flow pipe 41 of the other one of the adjacent two of the multiple electrolyzing assemblies 40. The sewage flows to the flow tube 71 from the outlet pipe 43 of a former electrolyzing assembly 40 and then flows through the outlet tube 73 to a next electrolyzing assembly 40. The two heating components 72 are respectively disposed on two opposite ends of the flow tube 71, are inserted into the flow tube 71, and are configured to heat up the sewage. Specifically, with reference to FIG. 10, the two heating components 72 of each one of the multiple heating assemblies 70 are electrically connected to said power storage module 50 and are configured to receive electrical energy supplied from said power storage module 50 and convert the electrical energy into heat.

The sewage filtering and purifying device of the second preferred embodiment is applied for agriculture or other industries requiring water at a certain temperature. By filtering of the multiple filters 30, purifying of the multiple electrolyzing assemblies 40, and heating of the multiple heating assemblies 70, the sewage is purified and is turned to usable water for industries at a certain temperature. Thereby, the sewage filtering and purifying device may purify sewage and directly apply the water after purification in agriculture or other industries. In other embodiments, as long as each one of the multiple heating assemblies 70 has at least one said heating component 72, the multiple heating assemblies 70 are still configured to heat up the sewage in the flow tube 71. In the second embodiment, the two heating components 72 respectively on the two opposite ends of the flow tube 71 increase efficiency of heating.

Moreover, with reference to FIG. 9, in the second embodiment, each one of the multiple heating assemblies 70 has a heated-fluid valve 74 disposed to the outlet tube 73. The heated-fluid valve 74 is drivable to switch between an open position and a closed position and is configured to allow the flow tube 71 and the flow pipe 41 of the corresponding electrolyzing assembly 40 to communicate with each other. By the heated-fluid valve 74, the sewage can be kept and heated by the two heating components 72 in each one of the multiple heating assemblies 70 continuously, which extends the heating time. Thereby, when usable water at a higher temperature is required, the sewage filtering and purifying device is capable of heating and purifying the sewage to provide usable water at the higher temperature.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sewage filtering and purifying device comprising:
   at least one purifying module having
   multiple filters connected in series; and
   multiple electrolyzing assemblies connected to the multiple filters to allow sewage to flow through and be filtered by the multiple filters and then sequentially flow through the multiple electrolyzing assemblies, and each one of the multiple electrolyzing assemblies having
   a flow pipe;
   two electrodes disposed inside the flow pipe and configured to be polarized for respectively being a cathode and an anode; and
   an outlet pipe connected to the flow pipe and configured to make the sewage flow from the flow pipe to said flow pipe of an adjacent one of the multiple electrolyzing assemblies or an exterior of the flow pipe, wherein the at least one purifying module has multiple heating assemblies;
   each one of the multiple heating assemblies is disposed between adjacent two of the multiple electrolyzing assemblies and has:
   a flow tube connected to the outlet pipe of one of the adjacent two of the multiple electrolyzing assemblies,
   at least one heating component inserted into the flow tube, and
   an outlet tube connected to the flow tube and the flow pipe of the other one of adjacent two of the multiple electrolyzing assemblies.

2. The sewage filtering and purifying device as claimed in claim 1, wherein
   the outlet pipe of each one of the multiple electrolyzing assemblies is disposed nearer to one of two opposite ends of the flow pipe than the other one of the two opposite ends of the flow pipe; and
   said outlet pipes of the multiple electrolyzing assemblies are configured to allow the sewage to flow from one of the two opposite ends of the flow pipe to the other one of the two opposite ends of the flow pipe while flowing through the flow pipe of each one of the multiple electrolyzing assemblies.

3. The sewage filtering and purifying device as claimed in claim 1, wherein each one of the multiple electrolyzing assemblies has a fluid valve disposed to the outlet pipe.

4. The sewage filtering and purifying device as claimed in claim 1, wherein the sewage filtering and purifying device has a pump connected to a respective one of the multiple filters of the at least one purifying module to allow the sewage to sequentially flow through the multiple filters.

5. The sewage filtering and purifying device as claimed in claim 1, wherein
   the sewage filtering and purifying device has a frame; and at least one power storage module disposed on the frame and electrically connected to the two electrodes of each one of the multiple electrolyzing assemblies; and the at least one purifying module is disposed on the frame.

6. The sewage filtering and purifying device as claimed in claim 5, wherein the sewage filtering and purifying device has a solar panel disposed on a top of the frame and electrically connected to the at least one power storage module.

7. The sewage filtering and purifying device as claimed in claim 1, wherein the at least one purifying module has a vertical connecting tube disposed between the multiple filters and the multiple electrolyzing assemblies;

an outlet valve disposed to a bottom of the vertical connecting tube and being drivable to allow the bottom of the vertical connecting tube to communicate with an exterior of the vertical connecting tube; and a valve disposed between the vertical connecting tube and the multiple electrolyzing assemblies and being drivable to allow the multiple filters and the corresponding electrolyzing assembly to communicate with each other.

8. The sewage filtering and purifying device as claimed in claim 1, wherein each one of the multiple heating assemblies has a heated-fluid valve disposed to the outlet tube.

9. The sewage filtering and purifying device as claimed in claim 1, wherein the at least one purifying module has a jet aerator having a first flow passage having a cross-sectional area;

a second flow passage communicating with the first flow passage and a respective one of the multiple filters to allow the sewage to sequentially flow through the first flow passage, the second flow passage, and the multiple filters and having a cross-sectional area smaller than the cross-sectional area of the first flow passage; and at least one aeration hole communicating with the first flow passage and configured to allow air to flow through the at least one aeration hole, enter the first flow passage, and flow to the second flow passage along with the sewage flowing through the first flow passage.

* * * * *